US006773588B2

(12) United States Patent
Beeman et al.

(10) Patent No.: US 6,773,588 B2
(45) Date of Patent: Aug. 10, 2004

(54) PURIFIED WATER SUPPLY SYSTEM

(75) Inventors: David R. Beeman, Camarillo, CA (US); Martin C. Swanson, Thousand Oaks, CA (US); Doug Horn, Prescott, AZ (US)

(73) Assignee: The Water System Group, Incorporated, Camarillo, CA (US)

( * ) Notice: Subject to any disclaimer, the term of this patent is extended or adjusted under 35 U.S.C. 154(b) by 0 days.

(21) Appl. No.: 10/719,804

(22) Filed: Nov. 21, 2003

(65) Prior Publication Data

US 2004/0104157 A1 Jun. 3, 2004

Related U.S. Application Data

(63) Continuation of application No. PCT/US03/18709, filed on Jun. 12, 2003.
(60) Provisional application No. 60/388,507, filed on Jun. 12, 2002.

(51) Int. Cl.[7] .............................. C02F 9/00; C02F 9/12; B01D 63/10; B01D 65/02; B01D 61/08
(52) U.S. Cl. ....................... 210/232; 210/335; 210/266; 210/257.2; 210/321.83; 210/85; 210/87; 210/89; 210/104; 210/321.69; 210/106; 210/132; 210/134; 210/138; 210/143; 210/103; 210/340; 210/416.3
(58) Field of Search ................................ 210/232, 335, 210/266, 257.2, 321.83, 85, 87, 89, 104, 321.69, 106, 132, 134, 138, 143, 103, 340, 416.3

(56) References Cited

U.S. PATENT DOCUMENTS 3,786,924 A * 1/1974 Huffman .................. 210/257.2
3,992,301 A * 11/1976 Shippey et al. ............. 210/636
4,629,568 A * 12/1986 Ellis, III ..................... 210/636
4,961,851 A * 10/1990 Barbachano et al. ... 210/321.65
5,002,664 A * 3/1991 Clack et al. ................ 210/251
5,143,601 A * 9/1992 Slovak et al. ................ 210/90
5,755,957 A * 5/1998 Jeon ............................ 210/86
6,080,313 A * 6/2000 Kelada ....................... 210/631
6,203,714 B1 * 3/2001 Bos et al. ................... 210/798

* cited by examiner

Primary Examiner—Thomas M. Lithgow
(74) Attorney, Agent, or Firm—Fitch, Even, Tabin & Flannery

(57) ABSTRACT

A system (11) for providing purified water comprises a plurality of individual modules, each of which includes a separable head (13) and a canister (17), which modules are joined one to another via these heads to create a composite manifold (15). The heads and canisters are respectively of substantially identical construction, and the hollow canisters include the following units: preheater, prefilter (25), pump (27), membrane purification (29), postfilter (31), and UV treatment. The overall system is monitored by a control unit (131) that is regularly interrogated by an off-site, headquarters computer, and both the control unit (131) and the headquarters computer are proactive in detecting potential difficulties that may be able to be readily remedied by promptly dispatching a serviceperson with a replacement for the canister containing the operating unit that requires replacement. The system itself is designed for extended term operation using a spirally wound, RO membrane purification element (29) by automatically and repeatedly flushing the feed passageways in the RO element whenever the storage tank (123) is full of purified water, using a purified water feed from an auxiliary purification unit (85) for such flushing.

20 Claims, 8 Drawing Sheets

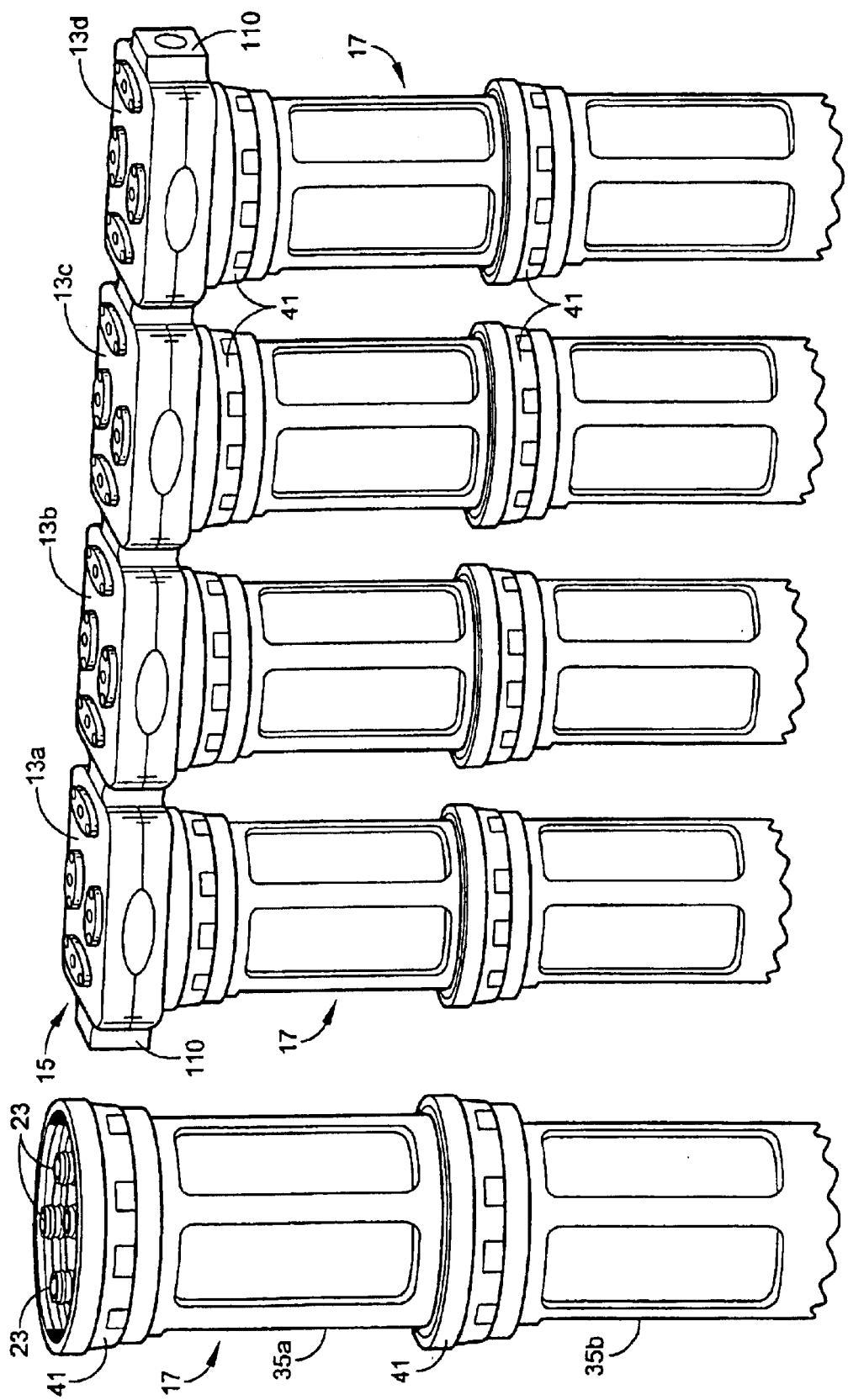

PURIFIED WATER SUPPLY SYSTEM

This application is a continuation of PCT/US03/18709, filed Jun. 12, 2003, which claims priority from U.S. provisional application Serial No. 60/388,507 filed Jun. 12, 2002.

The invention relates generally to systems for supplying purified water to a consumer or user thereof and more particularly to methods and apparatus for treating an incoming water supply, as from a municipal supplier, to consistently and reliably provide high quality purified water.

BACKGROUND OF THE INVENTION

Commercial and industrial installations that require quantities of consistently highly pure water have in recent years looked towards reverse-osmosis (RO) purification, together with ancillary treatment steps, to provide such a product from municipal or other water supplies that may vary from time to time in quality. In order to facilitate servicing of such systems, perhaps by personnel who are not mechanically trained and who do not carry sophisticated tools, what has become known as the canister system has been developed, some of which systems employ multiple canisters. Examples of such multi-canister systems are shown in U.S. Pat. Nos. 5,143,601, 5,354,464 and 6,027,644, the disclosures of which are incorporated herein by reference. Such systems may include two, three or four canisters that contain, in addition to a reverse-osmosis separation/purification element, a prefiltering element to remove sediment, particulate or other such materials, a postfilter cartridge containing activated charcoal, carbon or the like to remove off-tastes and perhaps an optional further UV cartridge that might be sequenced either before or after the carbon postfilter.

Although the embodiments illustrated in these patents demonstrate the basic concept of employing multi-canister manifold arrangements for the objective of producing a highly pure water stream from a municipal or other source of varying quality, they are considered to be only a starting point for facilitating the supply of a product stream of water of consistently high purity in a reliable manner that will obviate or minimize down-time should unforeseen difficulties arise.

Accordingly, it is an object of the invention to provide methods and apparatus for reliably supplying purified water on a consistent basis from a municipal or other water supply that might vary in quality.

It is another object of the invention to provide apparatus of this type that is highly versatile in the ability to combine components to create systems for a wide variety of applications ranging from household use to sophisticated industrial installations.

It is a still further object of the invention to provide apparatus of this type which can readily be serviced by relatively mechanically unskilled service personnel when needed to continue the reliable supply of consistently highly pure water.

It is a further object of the invention to provide systems of this type that can be remotely monitored, on an automatic or semiautomatic basis, in order to provide a proactive arrangement for detecting potential trouble spots in advance and replacing one or more canisters prior to having the quality of the output stream fall below the desired standard.

SUMMARY OF THE INVENTION

Very basically, the invention provides a system for providing purified water using a plurality of individual modules, each of which modules includes a separable head and canister, with the modules being joined one to another via these heads to create a composite manifold. The heads and canisters are of a substantially identical construction, respectively, and through the employment of adaptors incorporated within each canister, the composite canisters are individualized to house a wide variety of units. By "purified water" for purposes of this application is meant water that has been treated in any way so as to improve its quality, for example by filtering, by softening, by removal of dissolved solids with semipermeable membranes, e.g. RO membranes, etc.

In one particular aspect, the invention provides a system for providing purified water to a point of use (POU) from a municipal water source or the like, which system comprises a plurality of individual modules each of which includes a separable head and a canister, each of said heads having liquid inlet and outlet passageways, and means joining said heads of said plurality of modules one to another to create a composite manifold, said heads being of substantially identical construction and said canisters being of substantially identical construction so that such can be inexpensively manufactured, said canisters being hollow and having at least two interengaging sections including an upper section which mates with said head and a lower section, said hollow canisters containing different operating units, with at least one of said units being a pump and another being a purification unit, said upper section of each of said canisters containing an adaptor that creates a desired liquid flow arrangement between said inlet and outlet passageways in said head and the respective operating unit in said canister, and said modules in said composite manifold being interconnected for liquid flow between adjacent modules and being arranged so that said module containing said pump is upstream of said module containing said purification unit, whereby any canister of any module, including that containing said pump, can be easily and quickly replaced with a substitute.

In another particular aspect, the invention provides a system for providing purified water to a point of use (POU) from a municipal water source or the like, which system comprises a plurality of individual modules, each of which includes a separable head and a canister, each said head having liquid inlet and outlet passageways, means joining said heads of said plurality of modules one to another to create a composite manifold, said modules containing different operating units with said canister of one module containing a pump and drive motor and another said canister containing a main purification unit that includes a spirally wound crossflow reverse osmosis (RO) membrane element having a spiral feed passageway for feed flow axially therethrough, which element produces a product water stream and a concentrate stream, an auxiliary water purification device designed to operate on municipal water pressure to produce a stream of purified water, a storage tank for storing purified water from said main purification unit when more purified water is being produced than is being removed from the system at the POU, conduit means for delivering purified water from the outlet passageway in the head of said purification unit module to said storage tank, a reject conduit leading to drain which is connected to carry at least some of the concentrate stream from the RO element, means for determining when said storage tank is substantially full, an inflow conduit network for supplying water from the source to the module containing said pump and to said auxiliary purification device, a flush conduit connecting a purified water outlet from said auxiliary purification device to an inlet passageway in the head of the module containing the main purification unit, and a control unit interconnected with said determining means and said pump drive motor, which control unit is designed to, upon receipt of a signal from said determining means that said tank is full, halt operation of said pump motor, and initiate flow of water from said source to said auxiliary purification device, whereby purified water from said auxiliary purification device flows through said flush conduit and axially through said spirally wound membrane element to flush the feed passageways.

In yet another particular aspect, the invention provides a system for providing purified water to a point of use (POU) from a municipal water source or the like, which system comprises a pump and drive motor which are connected to supply water from such source to a main purification unit that includes a spirally wound crossflow reverse osmosis (RO) membrane element having a spiral feed passageway for feed flow axially therethrough, which element produces a product water stream and a concentrate stream, an auxiliary water purification device designed to operate on municipal water pressure to produce a stream of purified water, a storage tank for storing purified water from said main purification unit when more purified water is being produced than is being removed from the system at the POU, product conduit means for delivering purified water from said main purification module to said storage tank and to said POU, means for determining when said storage tank is substantially full, and control means for halting operation of said pump motor and initiating flow of water from said source to said auxiliary purification device upon such determination, whereby purified water from said auxiliary purification device is then caused to flow axially through said spirally wound membrane element to flush the feed passageway therein.

BRIEF DESCRIPTION OF THE DRAWINGS

FIG. 6 is a perspective view of a single, two-piece canister, with its attachment collar shown in place at its upper end.

FIG. 7 is a perspective view showing a four canister manifold arrangement the same as that illustrated in FIG. 5.

DETAILED DESCRIPTION OF THE PREFERRED EMBODIMENTS

Figure 1:
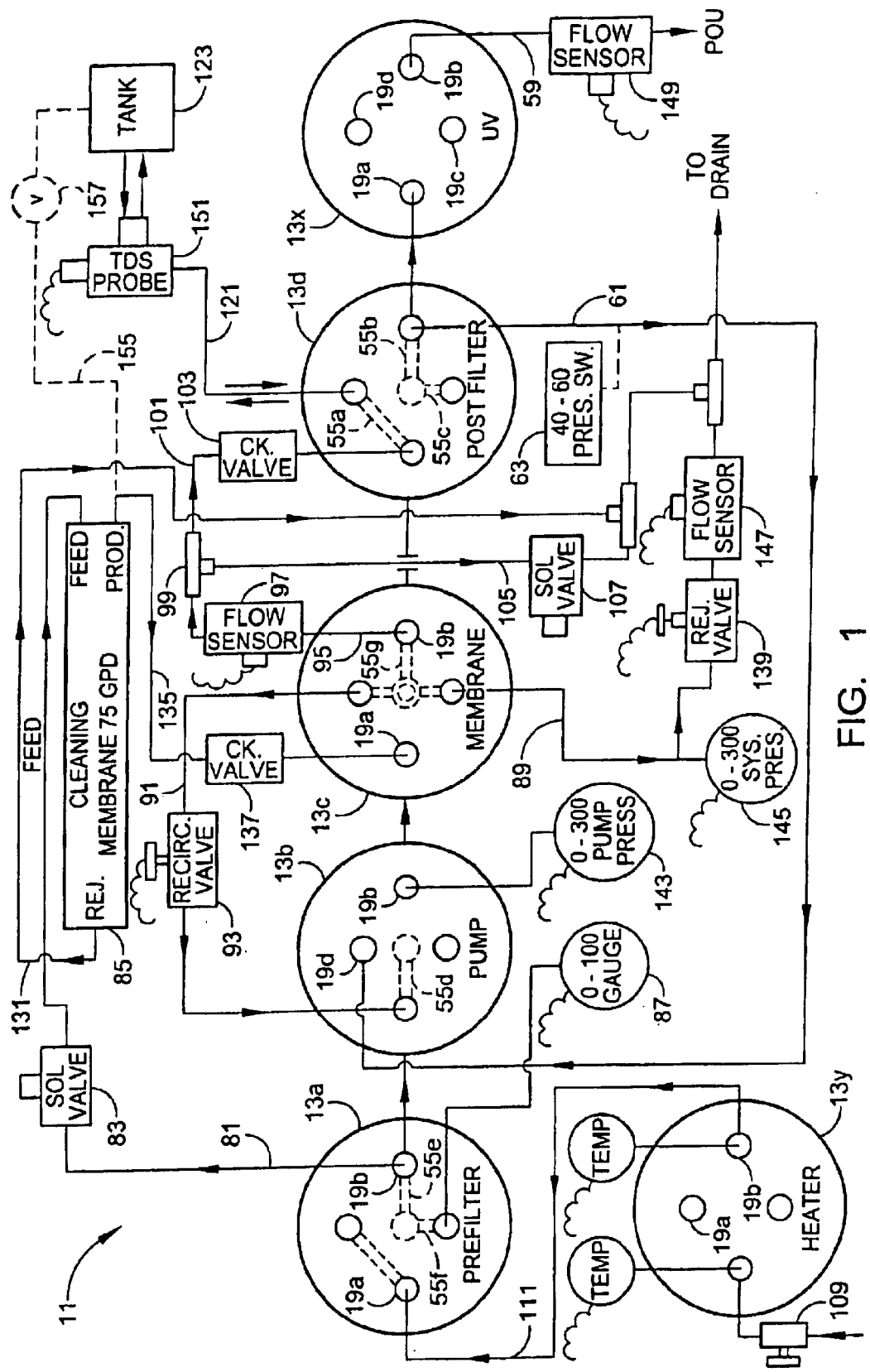
FIG. 1 is a schematic layout drawing showing an example of one apparatus/system embodying various features of the invention which employs a six-canister manifold for supplying highly pure water to a point of use and/or a storage tank.
Figure 2A:
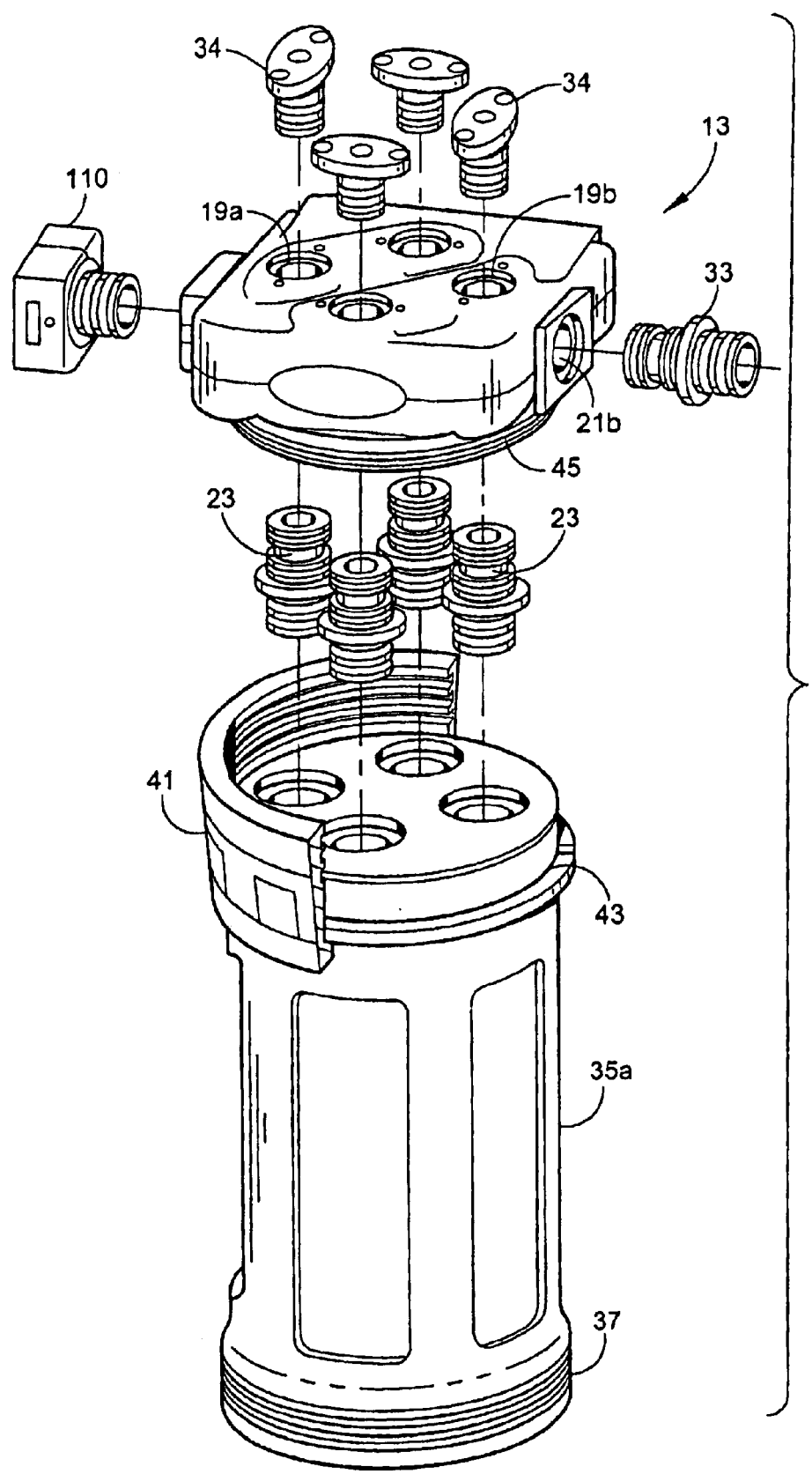
FIG. 2A is an exploded perspective view illustrating a portion of a module that might be located at one end of a manifold that is used in a system embodying various features of the invention such as that depicted in FIG. 1.
Figure 2B:
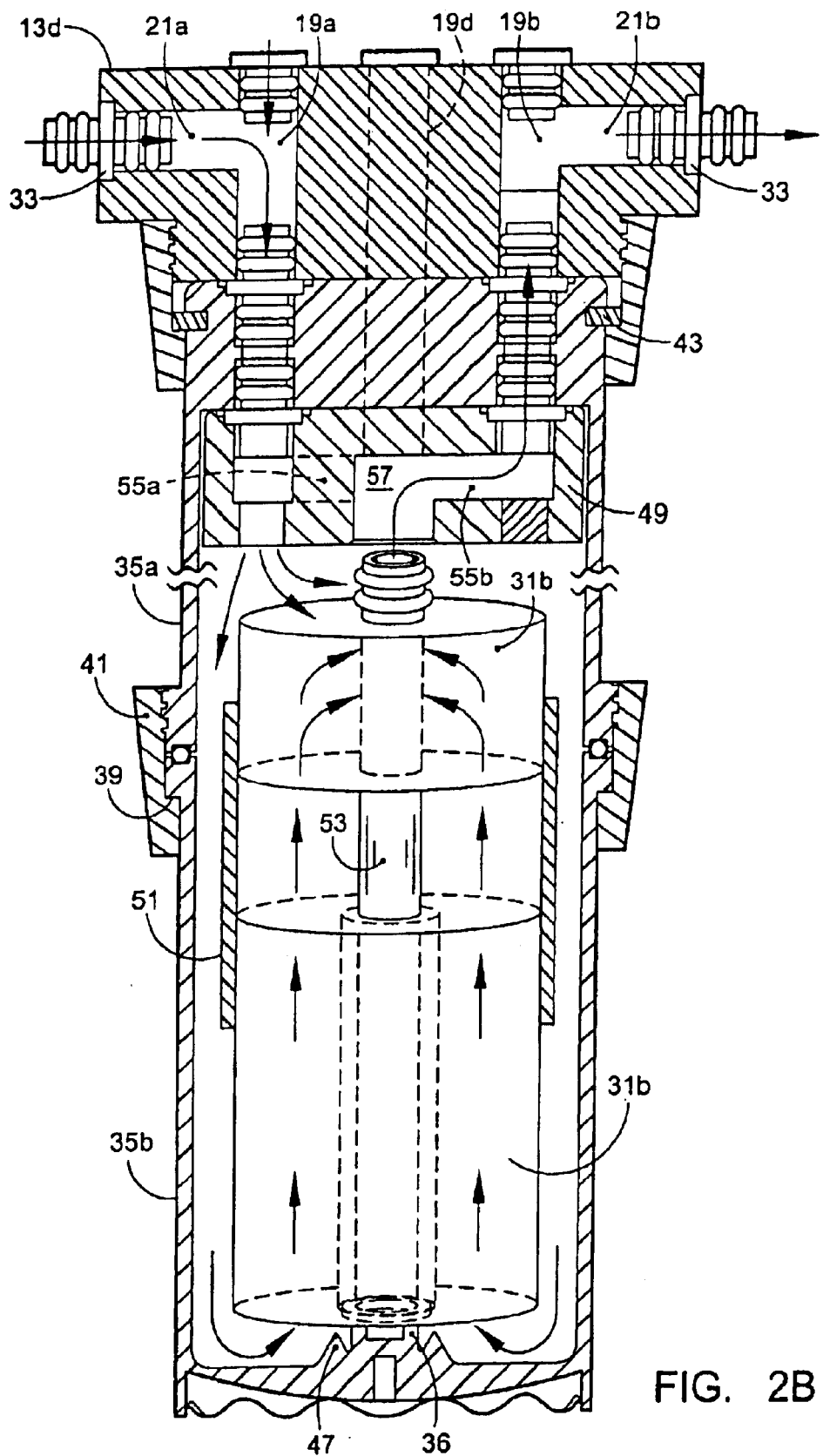
FIG. 2B is a diagrammatic view of a postfilter module showing one universal head of the type shown in FIG. 2A, to which the two portions of a split two-part body that exemplifies a universal canister are mated. In this instance, the illustrated canister carries a combined postfilter cartridge and an individualized plumbing adaptor.
Figure 3:
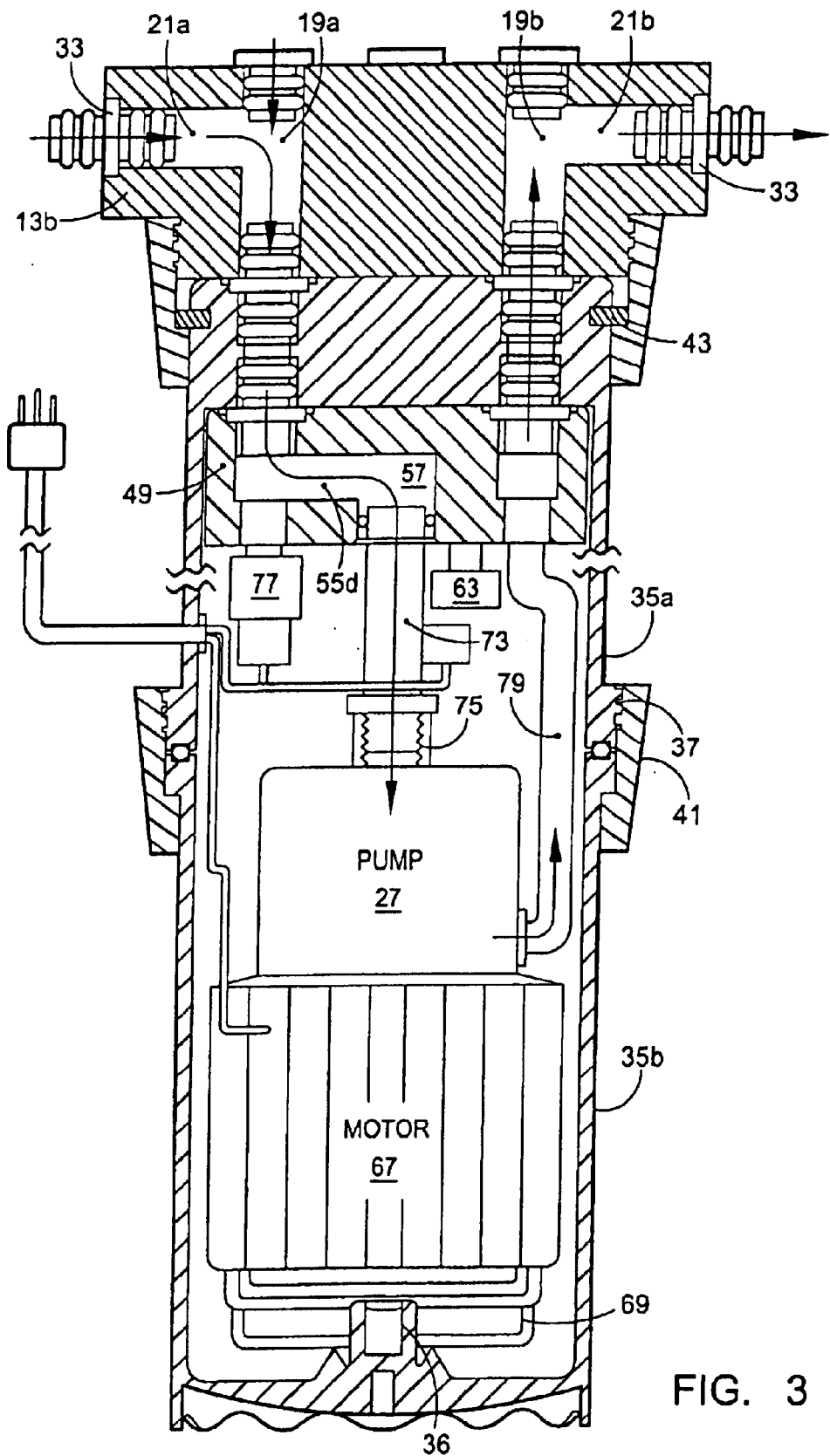
FIG. 3 is a view similar to FIG. 2B of a pump module which shows another of the universal heads that would be a part of the composite manifold of FIG. 1, and an electrically driven centrifugal pump with its associated operating control components, together with its appropriate individualized adaptor in the canister.

Illustrated in FIG. 1 is a system 11 for supplying purified water wherein six universal heads 13 are interconnected to form a representative composite manifold 15 including six operating modules; the view schematically shows the plumbing connections therebetween. For purposes of simplification, only the central four modules are shown interconnected in the embodiments depicted in FIGS. 5 and 7; however, the FIG. 1 schematic contemplates the addition of another module at each end. Each of the heads 13 is designed to interconnect with the upper end of a canister 17 of common size and shape that would be plugged vertically upward thereinto and then suitably secured in place to form one module. Each of the heads 13 is of substantially identical construction and is formed with four vertical passageways 19 which may be arranged in any suitable layout; for manufacturing convenience, they lie at 90° intervals on a circular centerline. Viewed from the front as seen in FIG. 1 and 7, they are referred to as the front, rear, right side and left side passageways. The two passageways 19a and b (which appear at the left and right hand sides) are respective referred to as the inlet and outlet passageways, and each one forms an internal tee connection with a passageway 21 that is substantially horizontal, as best seen in FIGS. 2B and 3. These four vertical passageways 19, at their lower ends, receive and interconnect in fluidtight relationship with, four spigots 23 carried by the upper end of each canister 17; all canisters are likewise of substantially identical exterior construction. Depending upon the particular operating contents of a canister 17, all or only some of these passageways in a particular head are operationally used; however, the use of such identical head 13 and canister 17 constructions facilitates very economical manufacturing. The combination of one head 13 and its mated canister 17 is herein referred to as an operating module.

In the illustrated embodiment, the four central modules in the illustrated series of six hereinafter are first briefly described in the sequence through which water flow through the system takes place; they are depicted schematically in FIG. 5. The first head 13a in this central group of four and its canister 17a contain one or more filter cartridges 25 and constitute a prefilter module. The second head 13b is connected to a canister 17b that contains a centrifugal pump 27 which powers the overall operation so that an external source of water pressure, e.g. municipal water supply pressure, need not be relied upon for powering the overall treatment operation. The third module canister 17c contains a separation/purification unit 29, which may preferably be a spirally wound reverse-osmosis (RO) membrane element; however, other purification and/or treatment units may alternatively be used as desired for a particular installation. It is referred to as the main purification module or unit. The fourth canister 17d of the central group contains one or more postfilters, e.g. polishing cartridges; for example, it may contain a calcite cartridge 31a located in series with and upstream of an activated charcoal cartridge 31b. As earlier indicated, the upper connecting ends of the canisters 17 are identical, and the head designs are universal, i.e. identical.

Although the core of the illustrated system utilizes the four modules or stations mentioned above, i.e. the prefilter, the pump, the main purification unit and the postfilter, optional additional stations can easily be included in such a system by adding one or more of these universal heads. For example, more and more facilities have begun to request UV treatment so as to positively guard against potential bacterial contamination, and an optional ultraviolet treatment station (shown as head 13x in FIG. 1) is often added at the downstream end of the illustrated modular manifold 15. Similarly, it is known that reverse-osmosis (RO) membranes operate more efficiently when the liquid being purified is at a temperature above 70° F. (21° C.), e.g. membrane performance of a particular RO element is frequently rated at 77° F. (25° C.). Thus, in some climes where the municipal water temperature is particularly cool and an RO is used as the purification unit, it may be desirable to add a simple heater at the upstream end of the modular manifold, and such a preheater module is also shown as head 13y in FIG. 1.

As previously mentioned and perhaps best seen in FIGS. 2B and 3, the heads 13 are of a singular design, and they are easily linked to one another in a straight line arrangement to create the composite modular manifold 15. They are preferably linked together using 2-headed tubular couplings or interconnectors 33 that have oppositely extending ends of the push-in-type, which ends each carry pairs of O-rings, as generally shown in the '464 and '644 patents, e.g. see FIGS. 12 and 13 of U.S. Pat. No. 5,354,464. Alternatively, female pipe threads could be molded into either or both of the horizontal passageways 21 in the heads so as to interengage with interconnectors having male pipe threads. They might alternatively be permanently adhesively bonded or otherwise cemented or welded to such interconnectors to create a manifold. The horizontal passageways 21 of the internal tees in each head are preferably coaxial, having a common axis that intersects with the vertical centerline of the head. Thus, these passageway centerlines lie in a vertical plane that is referred as the centerline plane of the modular manifold 15. One end of each coupling 33 is received in a horizontal passageway 21 of one of the adjacent heads 13; thus, they physically interconnect the two heads and generally also place the inlet and outlet internal tee connections of adjacent heads in fluid communication. In FIG. 1, the vertical passageway 19b at the farthest right of one head is usually interconnected by a coupling 33 with left hand vertical passageway 19a in the adjacent head. The other two vertical passageways are offset from the centerline plane and serve different functions in the different modules. The four vertical passageway openings at the top surface of each bead 13 may be provided with female threads so as to receive threaded conduits or connectors or threaded plugs; however, for manufacturing convenience in this illustrated embodiment, the upper ends of the four vertical passageways 19 receive top connectors 34 which carry pairs of O-rings that are attached by flat head screws and which have an inner diameter sized to mate with standard pipe threads on connectors or plugs or alternatively have smooth passageways for gasketed connections.

The lower end sections of each of the four vertical passageways 19 preferably have a smooth sidewall, and they are proportioned and arranged to receive the four upstanding short tubes or spigots 23 that are carried by the upper end of a universal canister 17. The universal canisters 17 are preferably molded from an appropriate polymeric material, such as glass-filled ABS, as two sections or halves 35, with each upper section 35a carrying the four spigots 23 and having an open bottom, and with each lower section 35b having an open top and a flat interior bottom wall that preferably carries an internal circular hollow sleeve or cup 36 on its interior surface. Because in most of the canisters, the sections 35 are about equal in length, they are generally referred as upper and lower halves, and the interconnection between the two halves 35 can be made using any mechanically acceptable and fluid-tight arrangement. In the illustrated construction, the exterior surface of the lower end of the upper half 35a carries male threads 37, and the upper end of the lower half 35b is formed with a slightly protruding circular flange 39 that provides a bearing surface against which an internally threaded collar 41 rotates as it is threaded upwardly onto the lower end of the upper half and tightened in sealing arrangement, as best seen in FIGS. 2B and 3. A desired angular alignment at the midpoint between the upper and lower halves may be assured by forming the edge of one half, e.g. the lower half 35b, with a lug and the edge of the other with a notch to accept the lug. A stop is preferably molded into the threads of the collar to prevent overtightening that might result in cracking and preferably to halt the collar 41 in a particular orientation so a tamper-evident seal can be used to connect with a boss on the upper half 35a, if desired.

As an alternative interconnection, each of the open ends of the canister halves (as well as the upper end of the upper half of the canister) might be constructed with radially extending flanges having one flat surface and one canted surface. Such a connection would have grooves in each of the flat surfaces that would accommodate one or two gaskets that would create a fluid-tight seal when the flat surfaces were pressed toward each other. With the flanges in alignment, a suitable split ring connector or the like, such as one having two halves that are connected at their free ends by a toggle, would be snapped onto the assembled canister in encircling arrangement to quickly and simply complete the joinder and seal.

A similar connection rotatable collar type interconnection is shown between the upper end of the canister upper half 35a and the lower end of the head; however, sealing is unnecessary at the head connection inasmuch as the four spigots 23 are individually sealed, through the double O-rings, to the interior surfaces of the four vertical passageways 19. Here, the collar 41 is installed downward over the upper end of the canister upper half 35a, and a snap ring 43 is installed in a groove formed in the canister outer surface (see FIG. 2A). The collar 41 will rotate about the undersurface of the ring 43 as it is threaded onto male threads 45 at the bottom of the head 13. An upstanding internal circular knife edge 47 at the bottom of the canister surrounds the sleeve 36 and is effective to seal against a circular gasket that might be carried at the end of a cartridge, so as to block flow that might otherwise reach a hollow axial region of such cartridge.

As previously mentioned, the design of the overall system permits mass production manufacturing of universal beads 13 and universal canisters bodies 17, that can then be joined together to create a modular, manifolded array containing from two to six or more separate and different operating stations. The individuality for each station or module is provided through the use of an individualized upper internal adaptor 49 that is incorporated into the upper end of each upper canister 35a, which transforms the universal canister body to one that is then plumbed specifically for use at a particular operating station.

Depicted in FIG. 2 is the postfilter module which, in the embodiment shown, disposes an activated charcoal or carbon cartridge 31b vertically above a calcite cartridge 31a of the same diameter with which it is in series flow communication. Such a joint cartridge is economically fashioned by providing a sleeve 51 that closely surrounds adjacent sections of the two individual cartridges 31 and seals to the exterior surface of each. The two cartridges 31 are structurally supported and aligned on a central tubular spine 53 which extends to the bottom wall of the lower canister half 35b where its lower end is plugged to close it and mates with the sleeve 36. Its upper end is open, and an upper section is permeable. The RO water enters the head 13d through the horizontal inlet-passageway 21a at the left-hand side which, together with the left hand vertical passageway 19a, forms what is referred to as the inlet tee; RO water can also enter through the upper end of the vertical passageway 19d as depicted, for a purpose explained hereinafter. In this canister 17, the individual adaptor 49 directs this incoming water stream either downward into the interior of the canister itself or through a horizontal shunt 55a (shown by the dotted connection in FIGS. 1 and 2B) which interconnects with a continuation of the rear vertical passageway 19d from the head. The downward flow of RO water exiting from the adaptor 49 floods the canister 17 in the region exterior of the cartridges.

During normal operation when purified water is being withdrawn at the POU, the incoming RO water flows downward along the exterior to the very bottom of the lower calcite canister 31a. It then flows upward through the bed of calcite, where adjustments are chemically made to pH and mineral content, as is well known in this water treatment art, and it exits at the top of the calcite cartridge where it fills the region in the sleeve 51 between the two cartridges. From here, it then flows upward through inlet ports in the bottom wall of the activated carbon cartridge 31b, finds its way through the bed of carbon particles, and exits by flowing radially inward through the porous, tubular wall of the activated carbon cartridge and through the perforated wall section of the tubular spine 53, into an axial center passageway provided by the hollow spine. This upward axial outflow of water from the activated carbon cartridge 31b is located on the centerline of the canister and is received in a central cylindrical chamber 57 at the bottom of the interior adaptor 49 (as indicated by the dotted concentric circle in the schematic representation of the head in FIG. 1) to which chamber wall the tubular spine 53 seals via a pair of O-rings carried at its top. The individual adaptor 49 for this postfilter canister routes the now calcite- and carbon-treated water through a shunt 55b to the vertical passageway 19b of the outlet tee connection (to the right in FIG. 1). The central chamber 57 may also be interconnected with the front vertical passageway 19c through a shunt 55c. At this outlet tee connection, the horizontal passageway 21b is the main output port through which the product water flow is piped toward a point of use. However, in the illustrated embodiment, it first flows through a final UV treatment module having the head 13x before it exits to the finished product water line 59 leading to the point of use. The upper end of the passageway 19b of the outlet tee connection is connected to a pilot tube or conduit 61 that leads to a vertical passageway 19 in the pump module head 13b where it connects to a pressure-activated switch 63 referred to as the 40–60 pressure switch for a purpose that is explained hereinafter.

Even though the switch 63 is schematically shown adjacent the head 13d in FIG. 1, it should be understood that it is preferably physically located in the pump canister as pointed out hereinafter. The interconnected front port 19c is not needed for any purpose; however, a pressure gauge could be optionally installed at the top of this interconnected vertical passageway 19c to provide a visual indication of the pressure of the purified water that is presently available at the POU.

The height of the combined cartridge 31 is such that it totally fills the interior space of the canister 17 in an axial direction. The closed lower end of the central spine 53 is seated in the sleeve 36, and an annular gasket at the bottom of the calcite cartridge 31a seats directly on the circular knife edge 47. The upper end of the tubular spine 53 serves as a stub connector, carrying a pair of O-rings; it is received in the central chamber 57 in the bottom of the interior adaptor 49 so that the bottom surface of the adaptor 49 may sit directly upon the top wall of the activated carbon filter cartridge 31. If in a particular installation, only a single short cartridge was felt needed, such might be accommodated in the upper-half 35a of the canister; in such a case an alternative form of a lower section that essentially acts as a short bottom plug might be used to close the lower end of the upper half 35a, which may be internally similarly configured.

Figure 9:
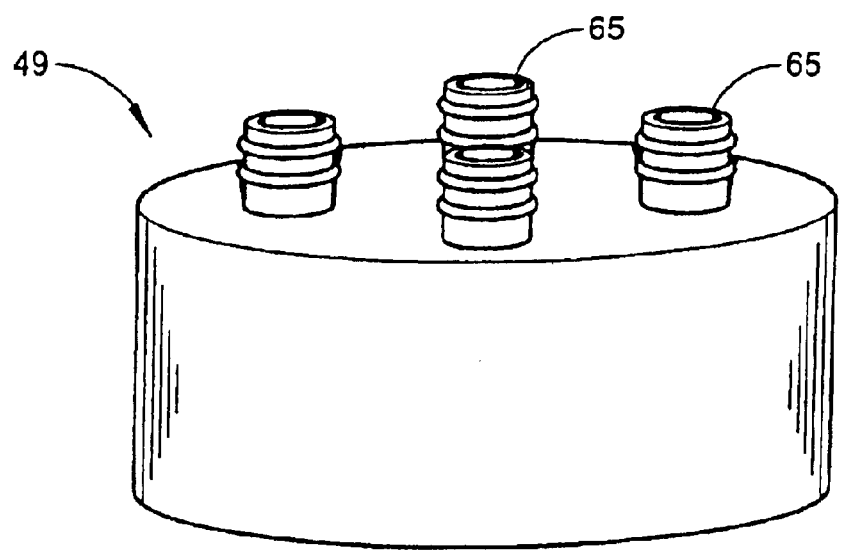
FIG. 9 is a perspective view of an internal adaptor that is individualized for each particular pump canister.

The exterior configuration of the common adaptor 49 is best seen from the perspective view of FIG. 9 showing four hollow pegs 65 which extend upward from the otherwise flat top surface of the adaptor, These pegs 65 may be either molded as integral parts of the adaptor 49 or they may be made as separate fittings and then sonic welded or adhesively sealed in place as shown in FIGS. 2B and 3. Each of the hollow pegs 65 carries a pair of O-rings, and the pegs are arranged in the same pattern as the four vertical passageways 19 and those that extend through the top of the canister upper half 35a. The four hollow pegs are sized so as to be sealingly received in the passageways below the four hollow spigots 23 that extend upward from the upper wall of the canister, and the basic design of the exterior of the common adapters 49 is universal, with the only differences being in the shunts 55 which are drilled after molding. Of course, some other suitable sealing arrangement between pegs and spigots could be used if desired. In the final assembly of the postfilter canister, the combined cartridge 35 would be placed centrally in the bottom of the half 35b of the canister, and with the interior adaptor 49 in place, the upper half 35a of the canister is placed over the four hollow pegs 65. Finally, the joint between the two halves is sealed by slipping a threaded collar 41 upward on the exterior of the lower half 35b and tightening it upon the male threads 37 on the upper canister half 35a.

A significant advantage of the overall system 11 lies in the incorporation of the pump 27 in one of the universal canisters 17 creating an easily replaceable modular component. This arrangement is more particularly shown in FIG. 3 wherein the generally cylindrical centrifugal pump 27 is seen mounted atop its electric drive motor 67 which is in turn bolted to the bottom wall portion of the canister 17 through the use of a suitable bracket assembly 69. This canister upper half 35a would normally have its sidewall suitably slotted or otherwise perforated, as by milling or routing slots therein, so as to provide ventilation for air-cooling of the pump motor; however, in all other respects, the two-piece canister would be the same as used for all of the other stations, so that they can all be economically manufactured from a single mold. This arrangement allows quick and fast replacement of the pump canister should the pump or the motor fail, whereas previously a trained technician would have generally been required to report, diagnose the situation and then arrange to replace a pump motor or a pump, as a result of which there might well have been significant down-time for the purified water supply system. With the illustrated arrangement, a relatively unskilled serviceperson can simply unplug the pump motor, remove the pump canister and replace it with a canister containing a new or rebuilt pump and/or motor; as a result, the system is back up and running in a matter of minutes following arrival of the serviceperson.

More specifically, the pump module is designed to take intake flow from the prefilter module through a horizontal interconnector 33 that is received in the horizontal passageway 21a of the inlet tee of the pump module head 13b and that joins it to the adjacent prefilter module head 13a. The inflow enters the inlet tee connection and is delivered to the spigot that is received in the passageway 19a at the left-hand edge of the head 13b, flowing through the associated hollow peg of the individual adaptor 49 for the pump canister. The upper end of vertical passageway 19a of the inlet tee also receives a recirculation stream from the RO purification unit, as hereinafter explained; thus, the incoming prefiltered water is being mixed with a flow of recycled concentrate from the RO unit, with this mixture entering the left-band hollow peg 65 in the internal adaptor 49 within the pump canister. In the illustrated arrangement, the adaptor routes the incoming mixed liquid stream through a shunt 55d to the central, downwardly open chamber 57 that receives a tubular coupling 71 which is linked to a solenoid-controlled valve 73 that is mounted on and leads to an axially disposed inlet 75 to the centrifugal pump 27. In the illustrated arrangement, a low-pressure monitoring switch or relay 77 is carried by and located on the undersurface of this internal adaptor 49, plugging the bottom of the inlet passageway below its junction with the shunt 55d. The outlet from the centrifugal pump 27 is a tube 79, that is preferably flexible, which is routed upward and into a vertical outlet passageway at the far right-hand side of the adaptor 49, which connects through the corresponding spigot to the outlet tee connection of the head.

In this head, the two front and rear vertical passageways 19 are not used for liquid flow. One may instead be optionally used to route electrical monitoring connections to the pump motor and the solenoid valve, instead of having them routed through the sidewall of the canister as shown; however the illustrated arrangement may be preferred to facilitate quick canister replacement. The rear passageway 19d may be used to receive the pilot tube 61 that is connected to the liquid outlet in the head 13d of the postfilter module, and the 40–60 pressure switch 63 would then be mounted at the bottom of this passageway. Because it is contemplated that 100% of the outlet flow from the pump 27 should exit through the horizontal outlet passageway 21b, the upper end of the tee connection might either be plugged or used to mount a pressure gauge or sensor that would monitor the output pressure from the pump to assist in remote monitoring of the overall system performance.

Figure 5:
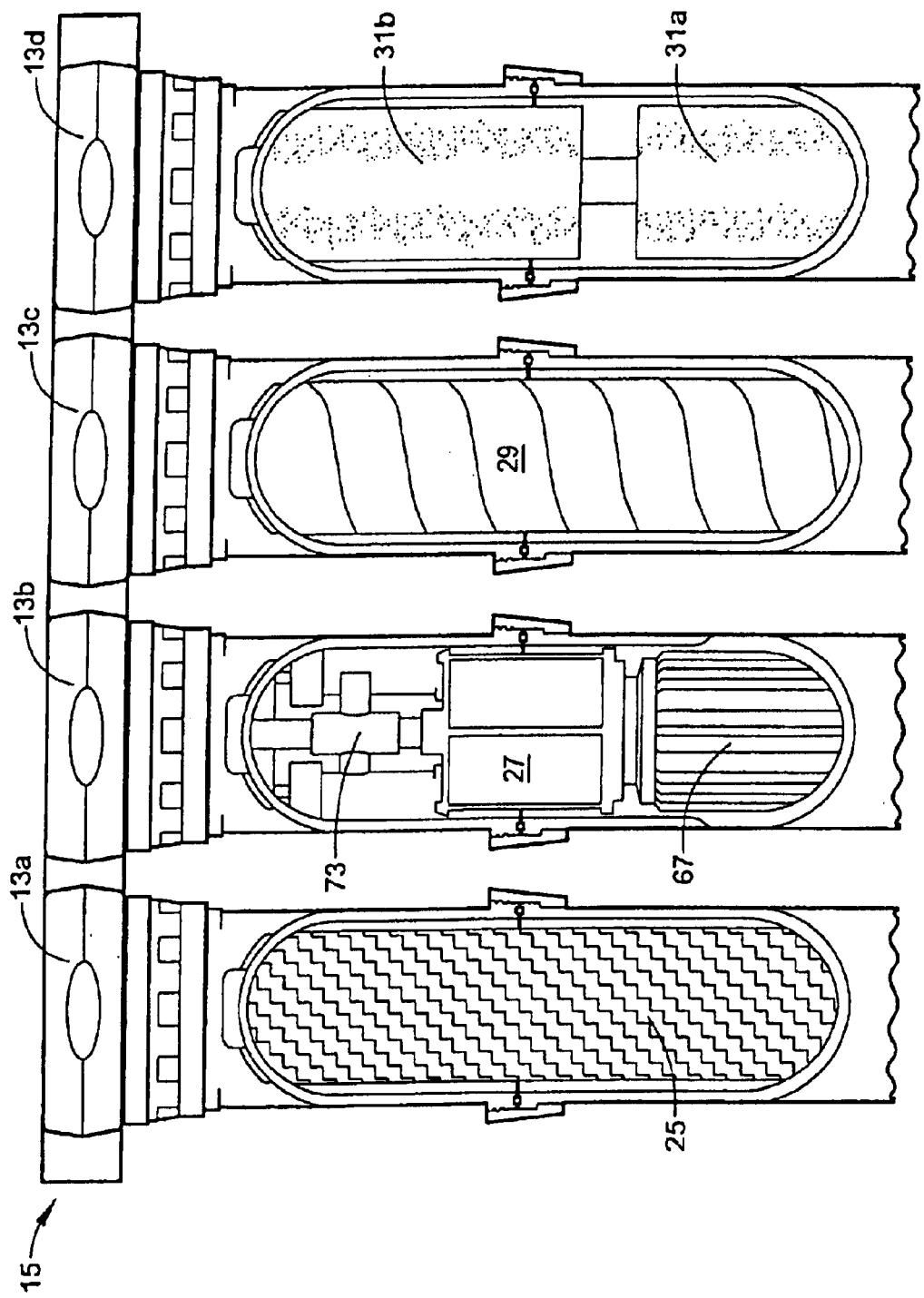
FIG. 5 is a front elevation view showing a four canister manifold of the character centrally depicted in the schematic layout of FIG. 1, with the canister walls broken away to schematically depict the operating units enclosed therewithin.

Although the prefilter and the membrane separation/purification canisters are not individually illustrated, they are schematically depicted in FIG. 5, and the arrangements are generally similar to that explained for the postfilter arrangement. More specifically, the interior adaptor 49 of the canister containing the prefilter 25, as can be seen schematically from FIG. 1, simply sends the incoming stream from the water source (which may first travel through an optional preheater module) downward to the bottom of the canister where it is forced to flow upward through a filter cartridge 25 that is designed to remove all sediment and particulate matter above a certain micron size, i.e. 5 microns. The prefiltered water stream exits via the central chamber 57 in the internal adaptor 49 that is connected, through shunts 55e and f, to vertical passageways 19b and c; during normal operation, the filtered water flows out through the horizontal outlet 21b of the outlet tee leading to the pump module head 13b via the standard interconnector 33. The vertical passageways 19a and d of the head 13a of the prefilter module are plugged at their tops. The adaptor 49 may optionally interconnect the passageway 19a and d (as shown in FIG. 1) to more uniformly distribute the inflow into the canister if desired. The vertical passageway 19b of outlet tee connection at the right-hand side is connected, at its upper end, to a line 81 which contains a normally closed solenoid valve 83 and leads to a small auxiliary RO cartridge or device 85 that serves a novel cleaning function, as described hereinafter. An inlet pressure gauge 87 is preferably located at the top of the head 13a at the remaining front vertical passageway 19c that is interconnected through the shunt 55f in the adaptor with the central chamber 57, and it provides a visual indication of the water pressure on the feed side of the pump 27, which is essentially that of the municipal water supply.

The purification canister 17 which holds the spiral wound RO element 29 is internally plumbed using standard connections for such a cross flow filtration element where a stream of liquid that is being treated is pumped axially through the membrane windings, to create a brine or concentrate stream that exits from the opposite axial end and a stream of purified water which has permeated through the membrane and which now exits from a center, perforated tube about which the RO element is wound. In this unit, the interior adaptor 49 is designed to direct all of the incoming flow to the bottom of the canister, where it enters the lower end of the element 29, flowing axially upward through the spiral feed passageways in the element itself. The internal adaptor 49 receives the purified water outflow from the central product water tube in its central chamber 57 where it is received in a specialized coaxial connector that directs it through a shunt 55g to the right-hand vertical passageway 19b of the internal outlet tee connection in the head 13c. The concentrate or brine flow exiting from the top of the spiral winding is routed by the coaxial connector to a pair of shunts leading to the front and rear vertical passageways 19c and d. This flow is split allowing some of the concentrate to go directly to drain via a line 89, and some of the flow to be returned via a recirculation circuit 91 containing a recirculation valve 93 to the upper end of the vertical passageway 19a of the inlet tee connection leading to the pump, as earlier mentioned. Such a recirculation of a portion of the concentrate to mix with the incoming raw water feed is common in RO purification operations. For other reasons to be explained hereinafter, rather than directly connecting the product water outlet through the horizontal passageway 21b to the postfilter module 13d, a blind or blocked mechanical interconnector is used to physically interconnect the two heads 13c and d of these two adjacent modules without allowing any horizontal flow of liquid therebetween. Instead, the product water exits through the upper end of the vertical passageway 19b in the head and flows into a line 95 containing a flow sensor 97 and then travels to a tee connection 99. From this tee a main line 101 leads through a check valve 103 to the top of the inlet tee of the head 13d of the postfilter module, and a side line 105, containing a normally closed solenoid valve 107, leads to drain through two more tee connections.

The canisters 17 are typically about 24 inches high, being formed in 12-inch halves, and they may be about 6 inches in internal diameter. If, for a particular application, a longer cartridge need desirably be accommodated, a third intermediate section might be added. The connection between the upper half 35a of the canister and the head 13 is preferably the same as that previously described for joining the two halves, namely a floating collar 41 that screws onto male threads provided at the bottom of the head 13 as depicted in FIG. 2A. Alternatively, split clamping rings or some other interconnection can be used. Such a secure connection to the bead is made after the four spigots 23 at the upper end of the canister, which individually carry spaced pairs of O-rings for sealing purposes, have been shoved axially upward into place within the four vertical passageways 19 in the universal head.

Preferably, the operating unit within each canister is sized so that it completely occupies the axial space therein. It is initially disposed in the lower half 35b with the internal adaptor 49 in place at the top of the unit, and this subassembly is then mated with the upper half 35a, with the gasketed hollow pegs 65 being sealingly received within the hollow spigots 23. The overall system is conveniently mounted to the wall of a building, e.g. a coffee house or restaurant or the like, using a frame that would be attached to the wall. The frame might have slots which would receive the individual heads of the manifold, that might then be bolted or otherwise suitably secured to join the manifold, to the frame before the individual canisters are installed in depending relationship from each head.

In the inflow conduit network, water from a municipal supply system or some other suitable source under pressure is piped through a main shut-off valve 109 to the inlet end of the system 11 where it enters via an end connector 110 of a type designed for placement at each end of the manifold 15, flowing into the head 13y of an optional preheater module that has temperature monitors in the upper ports of the inlet and outlet tees of the head, with the other two ports being blocked. This portion of the overall system leading to the intake to the pump 27 and the inlet to the auxiliary purification device 85 is referred to as the water inflow conduit network. The heated water then travels through a line 111 (e.g. the connector 33 between the heads 13y and 13a) to the prefilter module (as previously described), from which it exits via the outlet tee connection of the head 13a. Under normal operating conditions, the prefiltered water flows horizontally through the interconnector 33 to the head 13b of the pump module where its pressure is increased to the desired operating pressure for the RO element, e.g. 75 to 150 psig, with the pump discharge then being directed to the inlet in the head 13c of the membrane separation/purification module. After treatment therein, a product water stream from the purification module normally flows through the line 95 containing the flow sensor 97 and the check valve 103 into the postfilter module, where it is treated with both calcite and activated carbon before reaching the exit leading to the UV posttreatment module as illustrated in FIG. 1. As earlier pointed out, the internal adaptor 49 of the postfilter unit interconnects its inlet tee with the adjacent rear vertical passageway 19d in the head; this allows the full flow of purified water from the membrane purification module to continue even when the POU has no demand or only a diminished demand (so that the UV treatment module cannot accept all the purified water being produced). When this occurs, the incoming purified water is routed through a side conduit 121 leading to a storage tank 123. This may be either an atmospheric storage tank, having a float control or the like to determine its maximum water level, or a bladder-type storage tank of the type which is common in reverse-osmosis water purification units and provides the inherent pressure to later discharge water from the storage tank without any auxiliary pumping. Generally, if an atmospheric tank is employed, an auxiliary feed pump would be included in the side conduit 121, or in a separate parallel return line, to return the water from the storage tank 123 for its subsequent flow through the postfilter module and any UV processing unit, prior to delivery to the point of use. Although the plumbing connections to the storage tank are conveniently made in the head 13d of the postfilter module, such a connection to the storage tank can alternatively be made upstream or downstream of the head 13d of the postfilter module.

Whenever there is a demand for water at the point of use, e.g. when a valve or a tap is opened, water flows from the postfilter module through the optional UV treatment module to the point of use. The left-hand vertical passageway 19a in the head 13d of the postfilter canister is connected to a flow of purified water from the RO module, assuming the pump 27 is running at such time, which floods the canister of the postfilter unit. Normally, the pump 27 will be run until there is no longer a demand for water at the point of use and the tank 123 is fill; such is conveniently determined by reading the pressure that builds up in a system utilizing a preferred bladder-type storage tank. Similarly, when an atmospheric storage tank is determined to be full by a float or the like, an inlet valve to the tank is closed, and water pressure at the postfilter module will similarly quickly rise.

The monitoring device previously referred to as the 40–60 pressure switch 63 is used to accomplish this function of reading this increase in pressure and temporarily shutting down the operation when the tank is full. Although any suitable range of pressures can be employed, for purposes of illustration with a bladder-type storage tank 123, the switch is set to halt further operation when the pressure reaches about 60 psig, and to later reactivate the system and the pump motor 67 when the pressure has dropped to about 40 psig. As earlier indicated, although the pressure-reading switch 63 is shown in association with the postfilter module in FIG. 1, it has been found convenient to mount the switch in the pump canister 17 on the undersurface of its interior adaptor 49 as seen in FIG. 3. A simple pilot line 61, e.g. of quarter-inch tubing or the like, is employed to connect a port on the postfilter head 130 that is connected to the outlet tee with the port 19d that is used for this purpose in the head 13b of the pump module. When a pressure rise to 60 psig is detected, it is an indication that the storage tank 123 is full and that the POU is not requiring any significant amount of purified water. The pump motor 67 is then halted, and an appropriate signal is sent to a control unit 131. The pump motor will then remain off until the point of use draws sufficient water from a bladder-type storage tank so that the pressure has dropped to 40 psig, at which time active operation again begins.

When the control unit 131 detects that this 40–60 pressure reading switch 63 has interrupted electrical power to the pump motor 67, the control unit opens the solenoid valve 83 in the side conduit 81 leading to the auxiliary purification unit 85 and acuates a timing circuit. As a result, water at municipal line pressure, e.g. 50 to 60 psig, is fed to a low pressure, crossflow auxiliary RO membrane cartridge or device 85 that provides a stream of pure product water, which is shown as exiting from the right-hand end of the unit in FIG. 1 via a line 135 containing a check valve 137 that is referred to as a flush line. The brine or concentrate stream is shown as exiting via a line 131 from the left hand end of this auxiliary RO unit, and it is dumped directly to drain through two tee connections, entering the drain line downstream of a pressure-regulating reject valve 139. The product water flowing through the check valve 137 in the flush line enters the upper end of the inlet tee connection of the head 13c of the purification module, fills the region around the RO unit, and flows axially upward through the spiral passageways in the element in the same manner as would water being delivered from the pump outlet of the pump module during normal operation. This purified water flushes the inlet or feed surfaces of the spirally wound membrane and greatly extends the useful lifetime of the element. The concentrate from this flushing stream exits normally through the line 89 and flows through the pressure-regulating reject valve 139, which has now been opened by the control unit 131, and then to drain. Any product water which is created during this low pressure flow may be dumped to drain by opening the solenoid valve 107 in the side flow line 105 (shown schematically in FIG. 1 as passing between the main purification module and the postfilter module), which leads through the two previously mentioned tee connections downstream to the drain.

This flushing generally continues, so long as the pump 27 remains stopped, until the timing circuit in the control unit 131 times out. It is driven by line pressure and results in an excellent flushing of the feed passageways in the main RO purification element 29 while at the same time removing the incoming, normally high TDS liquid from the immediate membrane surface that could otherwise potentially diffuse by osmosis through the membrane and thereby momentarily reduce the quality of the initial output from the RO element when demand at the point of use reoccurs. Once the timing circuit of the control unit 131 reaches the predetermined number of minutes, flushing is considered to be complete, and the solenoid valves 83 and 107 are closed, and the pressure-regulating valve 139 is returned to normal operation thereby halting the operation of the auxiliary RO unit 85 being used for this cleansing purpose. It has been surprising to find that the incorporation of this repeated flushing arrangement can extend the average useful lifetime of an RO membrane element 29 (which may normally be an average of about 18 months) to about 36 months or even longer.

Figure 4:
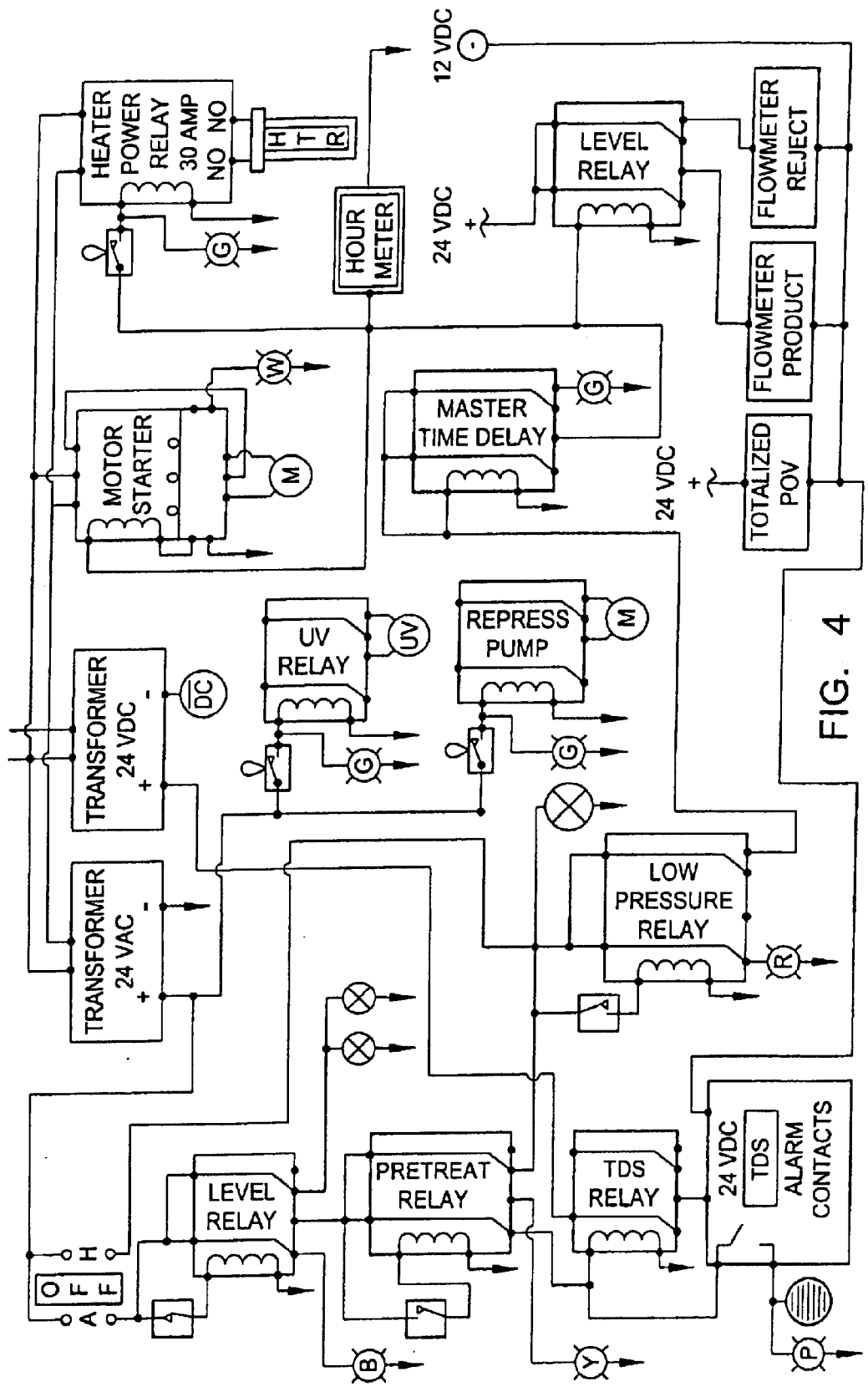
FIG. 4 is an electrical schematic diagram showing an example of an electrical arrangement that might be employed to operate a water purification system employing the composite manifold arrangement of FIG. 1.
Figure 8:
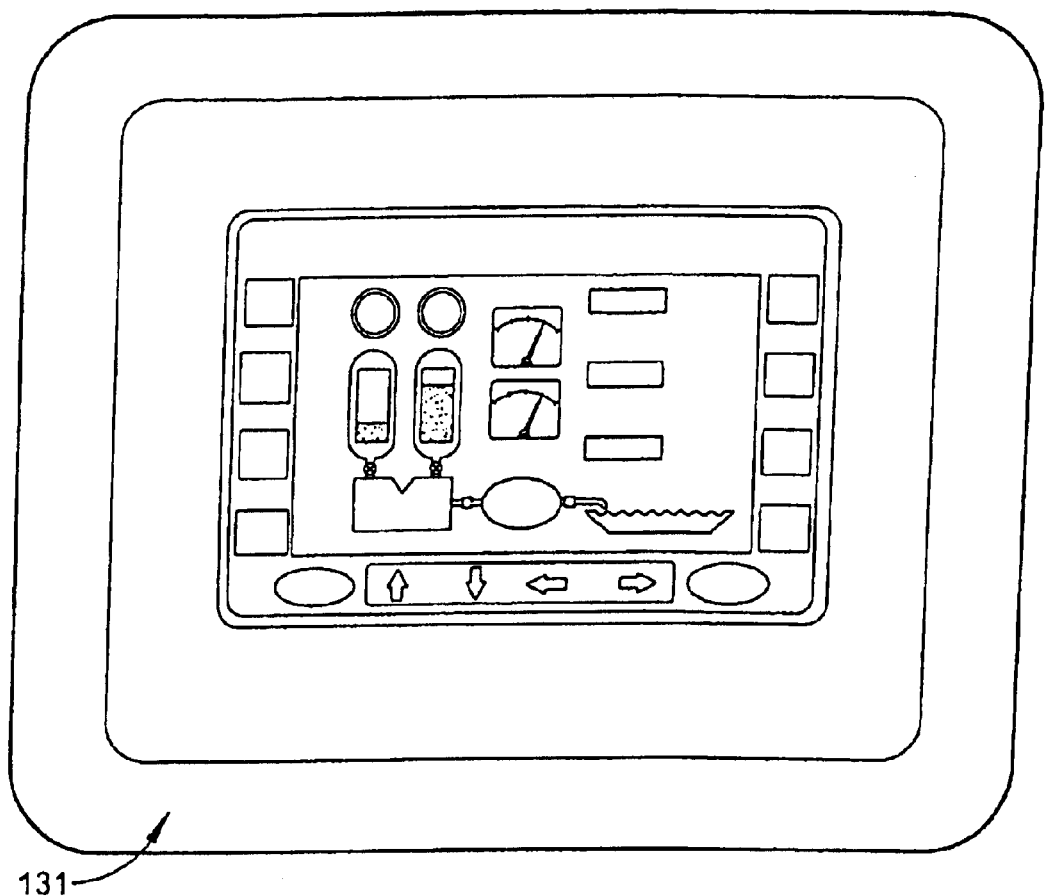
FIG. 8 is a schematic view of a control unit which might be employed to operate the water purification system illustrated in FIGS. 1 and 4.

The overall illustrated system lends itself very well to remote monitoring of its operation, which has been found to be important in order to assure that high quality water is reliably and consistently provided to a point of use. Particular aspects of a main portion of such a control unit and various items of the electrical operating system are illustrated in FIG. 4, which depicts the electrical operation and the various sensing arrangements that are incorporated. FIG. 8 depicts a representative display provided by the control unit 131. For example, if a preheater module is employed, temperature sensors are incorporated in the upper openings of the inlet and outlet tee connections of the head 13y of such a preheater module as previously mentioned, and the control unit 131 receives signals from these sensors so it can control a heater power relay to regulate the outlet water temperature as desired and so it can remove power from the heater should unexplained overheating occur.

Commonly, a pressure gauge/monitor will be connected to the outlet at the prefilter module head 13a, which allows a determination that there is adequate line pressure water available, as well as permitting early detection of a situation where the prefilter might be becoming clogged so as to recommend its replacement. Likewise, a pressure gauge/monitor 143 is desirably connected to the outlet tee connection in the head 13b of the pump module to monitor whether there is effective operation of the pump 27. Another pressure gauge/monitor 145 is generally included in the concentrate line 89 exiting the main membrane separation/purification module to indicate the pressure in the brine discharge line on the upstream side of the pressure-regulating valve 139, and a flowmeter 147 is also connected in this line, which sends its signal to the control unit 131 to allow monitoring and/or recording of the amount of flow to drain on the concentrate side of the membrane unit 29, which would be indicative of whether the desired amount of concentrate is being recirculated. Such flow might then be automatically adjusted by the control unit 131 by sending instructions to the recirculation line valve 93. The flow sensor 97 in the product outlet line 95 from the membrane module is also connected to send signals to the control unit. The low pressure relay 77 in the pump canister, which monitors pressure in the pump inlet line from the prefilter module, is also connected to the control unit; the relay is used to shut off the pump motor 27 to prevent burnout if inlet water pressure is lost. If such loss in pressure occurs, the control unit 131 will attempt to restart the system after preset time lapses, e.g. 30, 60, 90 seconds, to determine if water pressure has been restored.

A flow sensor 149 is normally also provided in the line going to the point of use, and it is electronically connected to the control unit 131 so the quantity of water being delivered may be continuously monitored. A TDS sensor 151 is commonly provided in the line 121 leading to the storage tank 123, and it is connected to a recorder that is part of the control unit 131 so that a record is made of the effectiveness of the RO unit 29 to purify the water (prior to its being treated in the postfilter module) over the lifetime of the spiral RO element.

All signals from these monitoring devices are preferably routed to the control unit 131 which is designed to electrically control all the operations of the overall system, as depicted in FIGS. 1 and 4. The data generated by all these various sensors is desirably gathered, accumulated and totaled, using appropriate computer programs, so that each step of the overall system is being carefully monitored. By setting up standards, a small computer that is incorporated as a part of the control unit 131 is able to continuously compare this data being accumulated to such standards. Not only is an excellent record of the overall daily operation provided, but it provides a proactive method of determining the likelihood of difficulties arising, as well as immediately indicating when some step is urgently needed to correct a failure that may have unexpectedly occurred. In this respect, the small computer which accumulates all of this data is desirably hooked up, via a telephone or Internet linkage, so that a central computer at a headquarters can interrogate the control unit 131 of each system at an operating installation at periodic intervals, e.g. once each day, and download its data for storage, comparison and further evaluation at the central location. Moreover, the overall system is preferably designed so that, once changes are detected that are indicative of a failure or a potential failure of one or more of the operating modules, the control unit at such operating installation will instantly contact the main computer at the central location to inform it of what has been detected. This report immediately alerts personnel, who may be monitoring the overall operation of perhaps 100 or more of these operating installations in a particular geographical area, to the occurrence of such a potential problem. By quickly reviewing and analyzing the data and the records of the past week or more received from that operating installation, trained personnel at headquarters can very likely determine which of the cartridges is responsible for this difficulty and can promptly dispatch a serviceperson to such operating installation with a replacement cartridge to immediately correct the problem. For example, if the low pressure relay 77 were to detect loss of supply water pressure from the municipal source or the like, and if this condition were to continue despite the repeated programmed attempts to restart the pump, the control unit 131 would shut down automatic operation of the system and immediately inform the main, off-site computer that an emergency had occurred while at the same time activating a visual and/or audible alarm at the site of the operating installation. The POU would of course continue to be supplied purified water from the storage tank 123 until such supply is exhausted. However, such early detection and alarm will very likely allow the system to be reactivated without any interruption in service to the POU, unless of course there should be some prolonged loss of municipal or other water supply.

As earlier indicated, the system at an operating installation is designed to always operate with a full storage tank of substantial capacity. Accordingly, if water quality presently being produced unexpectedly degrades or if the pump 27 malfunctions, the control unit 131 can shut down the pump motor 67, but the point of use will still be able to draw purified water from the storage tank 123 for a substantial length of time, even if the pump and membrane element combination is not operating to create any additional purified water. During this period of time, it should very likely be possible for a serviceperson, who should have been promptly alerted, to reach the location, substitute a replacement canister for that one which is experiencing difficulty and get the overall system back on stream before the proprietor even realizes that a problem exists. Furthermore if desired, a by-pass circuit 155 can be optionally provided, and the control unit 131 can be programmed to open the solenoid valve 83 in the clean line 81 of the inflow conduit network whenever the water in the storage tank 123 reaches such a dangerously low level that further supply to the point of use is about to be terminated. As a result, water, at municipal line pressure, is then fed to the auxiliary RO unit 85, creating product water that will flow to the storage tank 123 through this bypass circuit which includes a valve 157 that is remotely opened by the control unit 131. This option to provide only partially purified water, until such time as the overall system is back running again, may or may not be desirable depending upon a particular individual situation.

In any event, this modular manifold arrangement, which allows individual tailoring of the customized water to be delivered to a particular point of use, is one very substantial advantage of the overall design. The use of common structures, i.e. universal heads and universal two-piece canisters, for holding the various operating units, makes the system particularly economical to construct and to keep operating. Moreover, the central arrangement lends itself to the continuous monitoring of data, together with accumulation and evaluation of the gathered data, and provides the ability to be proactive in determining the likelihood of any potential difficulties. As a result, in most instances, replacement of a failed or about to fail component in a canister can be effected without any interruption of delivery of highly pure water to the customer. Furthermore, the novel repeated flushing arrangement of the feed passageways within a spirally wound membrane purification element very substantially prolongs the useful life of the RO element to provide highly purified water and, along with the other built-in safeguards mentioned just above, advantageously assures long-term, trouble-free supply of purified water.

Although the invention has been described with regard to certain preferred embodiments, which constitute the best mode presently known to the inventors, it should be understood that various changes and modifications as would be obvious to one having the ordinary skill in this art may be made without departing from the scope of the invention, which is set forth in the claims appended hereto. For example, the size limitations of the cartridges and the particular character of the operating units may be varied as preferred for any particular installation. For instance, another suitable type of auxiliary purification unit may be used instead of the illustrated spirally wound RO element. The disclosures of all U.S. patents mentioned hereinbefore are expressly incorporated herein by reference.

Particular features of the invention are emphasized in the claims that follow.

What is claimed is:

1. A system for providing purified water to a point of use (POU) from a municipal water source or the like, which system comprises:

a plurality of individual modules each of which includes a separable head and a canister, each of said heads having liquid inlet and outlet passageways, and means joining said heads of said plurality of modules one to another to create a composite manifold, said heads being of substantially identical construction and said canisters being of substantially identical construction so that such can be inexpensively manufactured, said canisters being hollow and having at least two interengaging sections including an upper section which mates with said head and a lower section, said hollow canisters containing different operating units, with at least one of said units being a pump and another being a purification unit, said upper section of each of said canisters containing an adaptor that creates a desired liquid flow arrangement between said inlet and outlet passageways in said head and the respective operating unit in said canister, and said modules in said composite manifold being interconnected for liquid flow between adjacent modules and being arranged so that said module containing said pump is upstream of said module containing said purification unit, whereby any canister of any module, including that containing said pump, can be easily and quickly replaced with a substitute.

2. The system according to claim 1 wherein the upper section of each said canister is formed with a plurality of upwardly extending spigots and each of said heads has formed, in its undersurface, a plurality of passageways which are proportioned and located to receive said spigots from any one said canister in sealing relationship therewith.

3. The system according to claim 2 wherein each of said spigots is tubular and of a circular cross section, and wherein each of said adaptors has a plurality of hollow pegs which are received within passageways in a top section of said canister upper section leading to one of said spigots.

4. The system according to claim 1 wherein said pump canister includes a centrifugal pump mounted atop an electric motor, wherein said internal adaptor in said pump canister carries a solenoid valve and a pressure sensor and wherein said liquid flow arrangement therein interconnects intake and discharge openings of said pump with said inlet and outlet passageways of the head of said pump module.

5. A system for providing purified water to a point of use (POU) from a municipal water source or the like, which system comprises:

a plurality of individual modules, each of which includes a separable head and a canister, each said head having liquid inlet and outlet passageways, means joining said heads of said plurality of modules one to another to create a composite manifold, said modules containing different operating units with said canister of one module containing a pump and drive motor and another said canister containing a main purification unit that includes a spirally wound crossflow reverse osmosis (RO) membrane element having a spiral feed passageway for feed flow axially therethrough, which element produces a product water stream and a concentrate stream, an auxiliary water purification device designed to operate on municipal water pressure to produce a stream of purified water, a storage tank for storing purified water from said main purification unit when more purified water is being produced than is being removed from the system at the POU, conduit means for delivering purified water from the outlet passageway in the head of said purification unit module to said storage tank, a reject conduit leading to drain which is connected to carry at least some of the concentrate stream from the RO element, means for determining when said storage tank is substantially full, an inflow conduit network for supplying water from the source to the module containing said pump and to said auxiliary purification device, a flush conduit connecting a purified water outlet from said auxiliary purification device to an inlet passageway in the head of the module containing the main purification unit, and a control unit interconnected with said determining means and said pump drive motor, which control unit is designed to, upon receipt of a signal from said determining means that said tank is full, halt operation of said pump motor, and initiate flow of water from said source to said auxiliary purification device, whereby purified water from said auxiliary purification device flows through said flush conduit and axially through said spirally wound membrane element to flush the feed passageways.

6. The system according to claim 5 wherein a side conduit interconnects said outlet passageway from the main purification module and a drain and includes a drain valve, and wherein said control unit opens said drain valve upon receipt of said signal.

7. The system according to claim 5 wherein said reject conduit contains a remote-controlled back pressure valve and wherein said control unit opens said downstream valve upon receipt of said signal.

8. The system according to claim 5 wherein a prefilter module having an inlet and an outlet is joined as a part of said composite manifold, which module is located upstream of said pump module and interconnected within said inflow conduit network, and wherein a solenoid-operated inflow valve is located in a conduit interconnecting said outlet of the prefilter module and said auxiliary purification device, which valve is opened by said control unit to supply water to said device.

9. The system according to claim 5 wherein a recirculation conduit is provided containing a recirculation valve, said conduit carrying a portion of said concentrate stream exiting said element to an inlet passageway in the head of the pump module.

10. The system according to claim 5 wherein a postfilter module is interconnected as part of said composite manifold and wherein said conduit means leading to said storage is tank interconnected with the head of said postfilter module.

11. The system according to claim 10 wherein said storage tank conduit means includes a total dissolved solids (TDS) monitor which is connected to the control unit.

12. The system according to claim 11 wherein a line leading to the POU contains a volumetric flow sensor that is connected to the control unit.

13. The system according to claim 12 wherein a product volumetric flow sensor which is connected to the control unit monitors the outlet flow of purified water from said main purification module.

14. The system according to claim 13 wherein a reject conduit that includes a volumetric drain sensor which is connected to said control unit carries at least a portion of the concentrate stream to drain.

15. The system according to claim 14 wherein the control unit includes a data communication linkage to an off-site computer monitor system, which off-site system is designed to evaluate data received from said control unit by comparing such received data with standards and to decide, based upon such evaluation, whether any module in the operating system is not performing and, if so, to accordingly dispatch a serviceperson with a substitute module.

16. A system for providing purified water to a point of use (POU) from a municipal water source or the like, which system comprises:

a pump and drive motor which are connected to supply water from such source to a main purification unit that includes a spirally wound crossflow reverse osmosis (RO) membrane element having a spiral feed passageway for feed flow axially therethrough, which element produces a product water stream and a concentrate stream, an auxiliary water purification device designed to operate on municipal water pressure to produce a stream of purified water, a storage tank for storing purified water from said main purification unit when more purified water is being produced than is being removed from the system at the POU, product conduit means for delivering purified water from said main purification module to said storage tank and to said POU, means for determining when said storage tank is substantially full, and control means for halting operation of said pump motor and initiating flow of water from said source to said auxiliary purification device upon such determination, whereby purified water from said auxiliary purification device is then caused to flow axially through said spirally wound membrane element to flush the feed passageway therein.

17. The system of claim 16 which includes an inflow conduit network for supplying water from the source to the module containing said pump and to said auxiliary purification device, and a flush conduit connecting a purified water outlet from said auxiliary purification device to an inlet passageway to the main purification unit, and wherein said control means includes a control unit interconnected with said determining means and said pump drive motor, which control unit is designed to, upon receipt of a signal from said determining means that said tank is full, halt said motor.

18. A system according to claim 17 wherein a reject conduit is provided to deliver at least a portion of said concentrate stream from said element to drain and contains a remotely operable valve and wherein said control means opens said valve and said reject conduit leading to drain when water is supplied to said auxiliary purification device.

19. A system according to claim 17 wherein a bypass conduit interconnects the purified water outlet of said auxiliary purification device through a remotely operable bypass valve to said storage tank and wherein said control unit is operable to open said valve in said bypass conduit and supply water from said auxiliary purification device to said storage tank if, for whatever reason, said pump cannot supply water to said main purification unit.

20. The system according to claim 17 wherein the purified water product outlet from said main purification unit is linked to the drain through a remotely operated drain valve and wherein said drain valve is opened by said control unit when water is supplied to said auxiliary purification device.

* * * * *